(12) United States Patent
Ritamäki et al.

(10) Patent No.: US 7,975,414 B2
(45) Date of Patent: Jul. 12, 2011

(54) LABEL COMPRISING A TRANSPONDER AND A SYSTEM COMPRISING A TRANSPONDER

(75) Inventors: Matti Ritamäki, Nokia (FI); Samuli Strömberg, Tampere (FI); Marko Hanhikorpi, Pirkkala (FI); Jarkko Miettinen, Ylöjärvi (FI); Lari Kytölä, Laukaa (FI)

(73) Assignee: UPM Raflatac Oy, Tampere (FI)

( * ) Notice: Subject to any disclaimer, the term of this patent is extended or adjusted under 35 U.S.C. 154(b) by 0 days.

(21) Appl. No.: 11/574,697

(22) PCT Filed: Sep. 2, 2005

(86) PCT No.: PCT/FI2005/000374
§ 371 (c)(1),
(2), (4) Date: Jan. 16, 2008

(87) PCT Pub. No.: WO2006/027409
PCT Pub. Date: Mar. 16, 2006

(65) Prior Publication Data
US 2008/0213525 A1    Sep. 4, 2008

(30) Foreign Application Priority Data
Sep. 6, 2004 (EP) .................................. 04397019

(51) Int. Cl.
*G09F 3/10* (2006.01)

(52) U.S. Cl. .................. 40/638; 340/572.8; 283/81
(58) Field of Classification Search ............... 40/638, 40/630, 124.09, 124.11, 124.14, 124.16; 340/572.1–572.3, 573.5, 572.8
See application file for complete search history.

(56) References Cited

U.S. PATENT DOCUMENTS

| | | | |
|---|---|---|---|
| 5,645,300 A * | 7/1997 | Hill | 283/81 |
| 5,787,616 A * | 8/1998 | Rogers | 40/124.01 |
| 6,254,953 B1 * | 7/2001 | Elston | 428/40.1 |
| 6,618,969 B1 * | 9/2003 | Rogers et al. | 40/124.16 |
| 6,644,697 B1 * | 11/2003 | Schinella | 283/116 |
| 6,667,092 B1 * | 12/2003 | Brollier et al. | 428/182 |
| 6,724,311 B1 * | 4/2004 | Kolton et al. | 340/572.8 |
| 6,836,215 B1 * | 12/2004 | Laurash et al. | 340/572.1 |
| 2003/0080917 A1 * | 5/2003 | Adams et al. | 343/841 |

FOREIGN PATENT DOCUMENTS

| | | |
|---|---|---|
| EP | 0 858 061 A2 | 8/1998 |
| EP | 1275083 B1 | 8/2004 |
| WO | 01/94126 A1 | 12/2001 |

* cited by examiner

*Primary Examiner* — Joanne Silbermann
*Assistant Examiner* — Shin Kim
(74) *Attorney, Agent, or Firm* — Fitch, Even, Tabin & Flannery

(57) ABSTRACT

This relates to a label to be attached to a surface, the label comprising a transponder. The label comprises a non-adherent flap which contains the transponder. This also relates to a web comprising a backing web and labels, and to a system comprising a surface and a label.

22 Claims, 2 Drawing Sheets

LABEL COMPRISING A TRANSPONDER AND A SYSTEM COMPRISING A TRANSPONDER

Figures 1A, 1B:
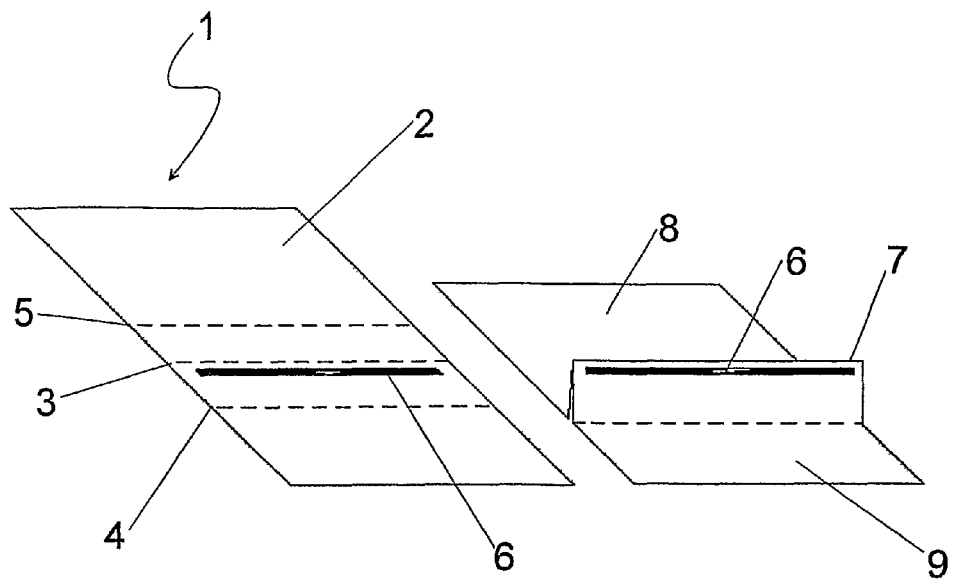

This application is a U.S. national phase application of International Application No. PCT/FI2005/000374, filed Sep. 2, 2005, which claims priority of European Patent Application No. 04397019.3, filed Sep. 6, 2004, which are hereby incorporated herein by reference in their entirety.

The present invention relates to a label to be attached to a surface, the label comprising a transponder. The invention also relates to a web comprising a backing web and labels, each label comprising a transponder, and to a system comprising a surface and a label comprising a transponder.

Transponders are used in secure supply chains in order to control the supply chain. The functioning of the transponders is often disturbed because packaging materials or contents of packages cause detuning or attenuation and as a consequence, the transponder does not work properly. Furthermore, different retail products have different dielectric characteristics and therefore different effect on electrical components, such as transponders. For example, on metal surfaces or on some other surfaces which have high RF losses, the transponders do not work at all.

In some cases the problem can be solved by manufacturing a suitable transponder for each application, but it is naturally an expensive way to solve the problem. It is also possible to make the label comprising the transponder thicker but then it is impossible to print the label by TTR (thermal transfer ribbon) printers or barcode printers, which are conventionally used by package manufacturers, such as CPG (consumer package goods) manufacturers. Different returnable transport items are often collected in the same place, and it is cumbersome if all types of the items require a tailored transponder.

Besides the solutions in which thickness is increased, certain hard materials or encapsulations have been used. Such labels can be neither printed nor attached automatically. Further, they are expensive.

Also a bent label has been introduced. It is intended to be attached to a target surface (in this application the target surface means any surface to which a label is attached) in such a manner that it is attached to the surface from its both ends and the middle of the label is loose from the surface. A problem with the bent label is that it is difficult to attach to the target surface, and a bent antenna does not work as well as a straight antenna. Further, the loose part of the label is easily torn.

Publication US 2003/0080917 discloses a dielectric shielding for improved RF performance of RFID. The shielding is formed from a release liner which remains between the transponder and the target surface, or the shielding is formed from a portion of a face sheet which is folded upon itself.

The label of the invention is characterized in that the label comprises a non-adherent flap which contains the transponder. The web of the invention is characterized in that each label comprises a non-adherent flap which contains the transponder. The system of the invention is characterized in that the surface is provided with a spacer.

The labels of the invention can be handled as normal labels, for example they can be printed normally and they can be attached to the target surface automatically.

When the label of the invention is attached to the target surface, the flap containing the transponder remains loose, and thus the distance between the target surface and the transponder increases. The increase in the distance may be for example as small as 1 mm but it enhances the functioning of the transponder outstandingly, and the transponder is insensitive to the material onto which the label is attached. Before attaching the label to the target surface, the label can be printed normally because the flap is thin enough to pass the normal printing processes. Further, the labels comprising the flap can be manufactured in such a manner that only minor changes or no changes at all are required in the manufacturing lines. Thus, the manufacturing process of the label of the invention is cost-effective.

Still another advantage is that the label can be such that the transponder can be removed from the label at a desired stage. For example, when the label of the invention is attached to a consumer package, such as a drug package, the transponder can be removed when the package is sold to a consumer. Thus the threat that anybody can trace the package is eliminated.

The aim of the invention is to create a label which comprises means for increasing the distance between the target surface and the transponder. The target surface can be any surface to which the label is attached. The target surface can be a surface of a corrugated case, or a surface of a returnable transport item (RTI), such as a pallet, a roll container, or a crate. The typical use of the invention is with packages which are piled on pallets. The pile of packages is usually wrapped with a shrink-wrap film. The label of the invention can be attached to the pallet, the shrink-wrap film, or to each package in the pile. When the packages or their contents comprise metallic parts, or the packages include liquids, it is expectable that problems with conventional labels occur, and thus the label of the invention is a solution which can be used under such difficult conditions.

The transponder comprises an electrically operating RFID (radio frequency identification) or RF-EAS (electronic article surveillance) circuit on a surface of a substrate. The substrate is usually of a plastic material, such as polyester. The electrically operating RFID circuit of the transponder is an electric oscillating circuit (RCL circuit) operating at a determined frequency. The circuit comprises an antenna and an integrated circuit on a chip. The antenna can be a coil, an antenna based on the dipole antenna technique, or any other planar antenna technique. In the label of the invention, the antenna is often based on the dipole antenna technique, and the transponder preferably operates at ultra-high frequencies (UHF). The antenna is preferably of aluminium, copper, silver, or a conductive polymeric material, and it is formed on the substrate for example by etching, printing, electrolysis, plating, or by some other additive techniques. The chip is electrically or capacitively connected to the antenna, and it can be attached to the antenna either directly, or via a module which comprises the chip and required electrical contacts.

The label of the invention can be a logistic label which comprising a face side, which can be used as a printing substrate for normal printed information, barcodes, or ePC (electronic product code). It is, however, possible that the face side does not contain any printed information. The size of the label can be for example 3×3, 4×6, or 6×6 inches, and the label is preferably of paper. Besides paper, any suitable material can be used. The label has a loose flap at its any edge, or the flap forms a ridge, which protrudes from the plane of the label. It is insignificant whether the flap is in the cross-direction of the label, or perpendicular to the cross-direction. A transponder is placed on the reverse side of the label by using the adhesive which is on the surface of the label. To ensure that the transponder and the target surface have a certain minimum distance between them, folds can be used. Depending on the embodiment, the fold can be provided with perforations, cuts or scores to further enhance the functioning of the fold. The above-mentioned aids can also be used for removing the transponder. The flap can be formed in the label in a suitable process step, for example in the initial manufacturing process of the label, in the printing step, or in the application step of the label. The application step refers to the step in which the label is attached to the target surface. It is possible that the labels are arranged on a surface of a backing web, which can be of release paper, in such a manner that a continuous web comprising labels is formed.

It is also possible that the label of the invention has the transponder attached to its front side. To form the flap, a part of the reverse side of the label must be free of adhesive, or there must be a backing sheet against adhesive.

Another embodiment included in the invention, is a spacer which is attached to packaging material. The spacer can be a ring onto which the label is attached. The ring can be made of cardboard, and it can be provided with adhesive. An array of rings can be arranged on the surface of a continuous web from which they are picked automatically and attached to the target surface. The continuous web can be for example release paper.

In the following, the invention is described by using figures in which

FIGS. 1a, 1b, 2a, 2b and 3 show labels of the invention.

FIGS. 1a and 1b are perspective views of one label according to the invention. A label 1 has a face side 2 which can be used as a printing substrate, and a reverse side (not shown) which is provided with adhesive. The adhesive is preferably a pressure sensitive adhesive but also other adhesives are possible.

A transponder 6 comprising a substrate and an antenna and a chip on the surface of the substrate is dispensed to a close proximity of a line 3. The label 1 is folded along the line 3 in such a manner that the reverse sides of the label on both sides of the line 3 adhere to each other, and thus a flap 7 comprising the area between the lines 4 and 5 is formed. According to FIG. 1, the label 1 has two areas 8 and 9 which can serve as printing substrates, and which have adhesive on their reverse side.

Figures 2A, 2B:
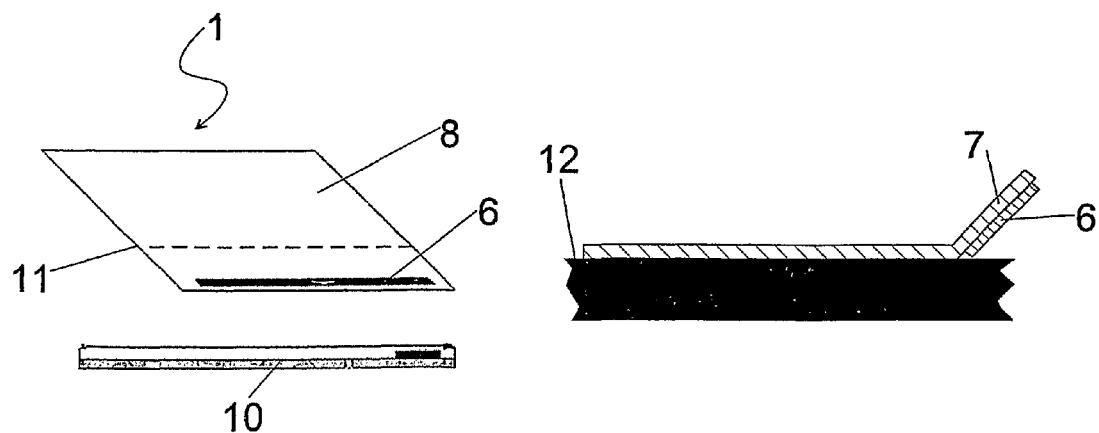

FIGS. 2a and 2b show other labels according to the invention. In FIG. 2a (which actually comprises two figures, namely the upper which is a perspective view of the label of the invention, and the lower which is a cross-sectional view of the label of the invention), a transponder 6 is attached to the reverse side of a label 1. That side of the transponder 6, which is not in contact with the reverse side of the label 1, is provided with adhesive. A backing sheet 10 is attached to the reverse side of the label 1 so that it covers the reverse side of the printing area 8 and the transponder 6. The backing sheet is scored along a line 11. When the label 1 is attached to the target surface the backing sheet 10 is removed from the area 8 but it is retained on the back surface of the transponder 6.

In FIG. 2b, which is a cross-sectional view, a transponder 6 which is not provided with adhesive on its reverse side is attached to the reverse side of a label 1. The transponder 6 attached to the label 1 forms a flap 7 and forces the flap 7 to form an angle with the target surface 12.

Figure 3:
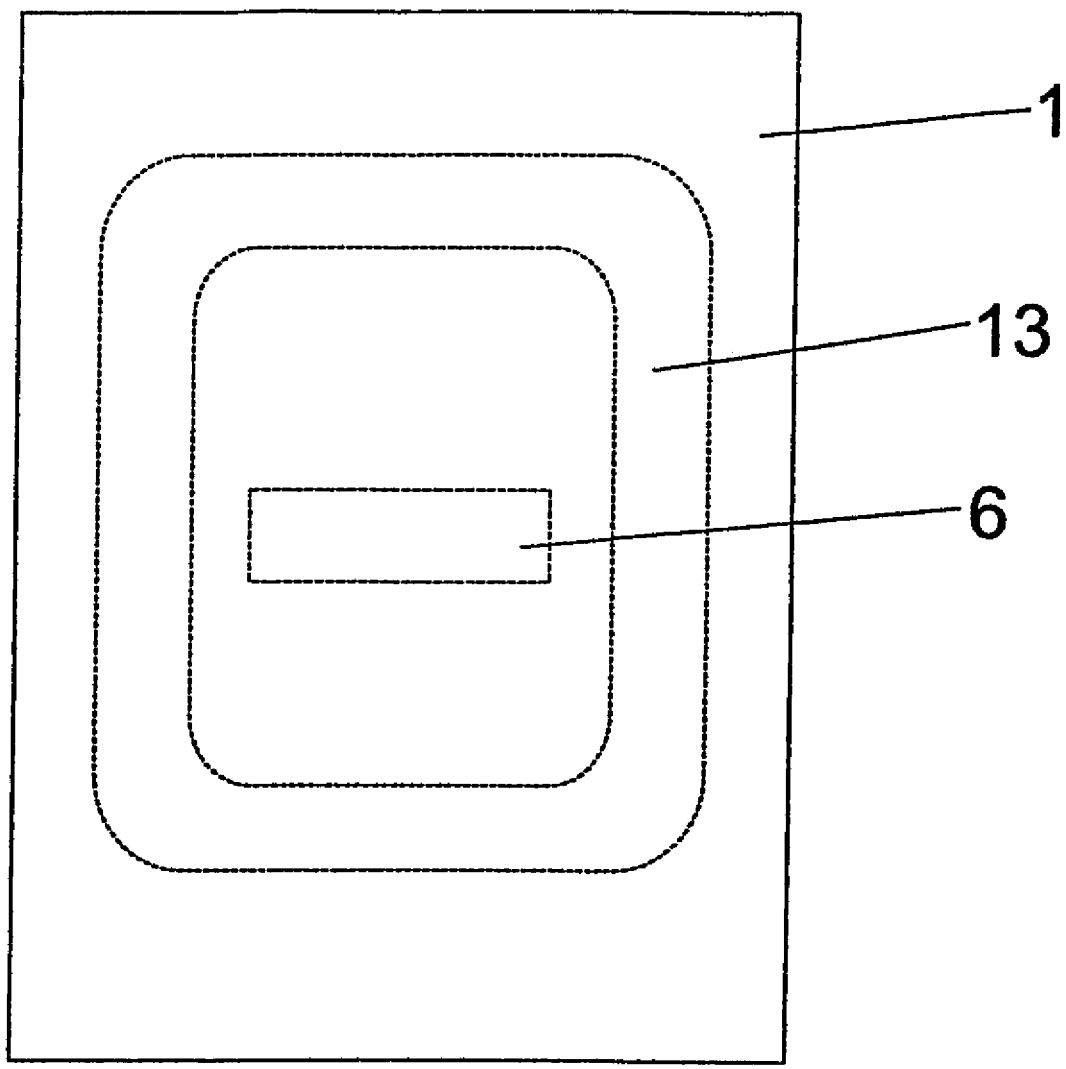

FIG. 3 shows a front view of one embodiment of the invention. A label 1 comprising a transponder 6 is attached to a spacer 13, which is attached to the target surface (not shown). It is possible to provide between the label 1 and the spacer 13 some material, for example a shrink-wrap film. The spacer 13 is preferably made of cardboard, and it can be attached to the target surface beforehand.

The above-mentioned embodiments do not restrict the scope of the invention. The flap label can be formed in the label at any stage, and the flap may include other materials and other parts in addition to those described above.

The invention claimed is:

1. A label to be attached to a target surface, the label comprising:
   a first area in a first plane;
   a second area in the first plane; and
   a third area between the first area and the second area, the third area in the first plane and when folded forms a flap which comprises an antenna and which flap extends from the first plane when the third area is folded, which areas when folded provide a label which holds the antenna away from the target surface to effect enhanced radio frequency wireless communication functionality as compared to a label which does not hold the same antenna from the target surface.

2. The label according to claim 1, wherein at least one of the first and second areas has a printable substrate.

3. The label according to claim 1, wherein the flap further includes a transponder which is connected to the antenna, the transponder and antenna forming an electronic article surveillance circuit.

4. The label according to claim 1, wherein the flap further includes a transponder which is connected to the antenna, the transponder and antenna forming a radio identification circuit.

5. The label according to claim 3, wherein the label has a face side configured to face away from the target surface when mounted thereon and a bottom side opposite the face side and wherein the transponder is on the face side of the label.

6. The label according to claim 4, wherein the label has a face side configured to face away from the target surface when mounted thereon and a bottom side opposite the face side and wherein the transponder is on the face side of the label.

7. A web comprising a backing web and labels, the labels comprising two adhesively attachable areas configured for adhesive attachment to a target surface and a non-adherent flap/transponder area, the non-adherent flap/transponder area including a transponder, the adhesively attachable areas defined from the non-adherent flap/transponder area by two attachable area fold lines with the non-adherent flap/transponder area between the two attachable area fold lines, the non-adherent flap/transponder area having a top flap line which when folded at a top of the non-adherent flap/transponder area raises above and away from the target surface after the adhesively attachable areas are attached to the target surface, the attachable area fold lines and the top flap line when folded effect holding the non-adherent flap/transponder area away from the target surface after the adhesively attachable areas are attached to the target surface to provide a label and distance the transponder from the target surface to effect enhanced radio frequency wireless communication functionality as compared to a label which does not distance the same transponder from the target surface.

8. The label according to claim 3, wherein the label has a face side configured to face away from the target surface when mounted thereon and a bottom side opposite the face side and wherein the transponder is on the bottom side of the label.

9. The label according to claim 4, wherein the label has a face side configured to face away from the target surface when mounted thereon and a bottom side opposite the face side and wherein the transponder is on the bottom side of the label.

10. A label configured to be adhesively attached to a target surface, the label comprising two adhesively attachable areas and a non-adherent flap/transponder area, the non-adherent flap/transponder area including a transponder, the adhesively attachable areas defined from the non-adherent flap/transponder area by two attachable area fold lines with the non-adherent flap/transponder area between the two attachable area fold lines, the non-adherent flap/transponder area having a top flap line which is at a top of the non-adherent raised flap/transponder area which when folded is raised above and away from the target surface after the adhesively attachable areas are attached to the target surface, the attachable areas fold lines and the top flap line when folded effect holding the non-adherent raised flap/transponder area away from and distance the transponder from the target surface after the adhesively attachable areas are attached to the target surface to provide a label with enhanced radio frequency wireless communication functionality as compared to a label which does not distance the transponder from the target surface.

11. The label according to claim 10, wherein the adhesively attachable areas have attachable area face sides configured to face away from the target surface after the label is attached thereto and attachable area bottom sides opposite the attachable area face sides, and the raised flap/transponder area has a flap face side and a flap area bottom side, the attachable areas bottom sides having adhesive thereon to effect attachment to the target surface, the flap bottom side having adhesive thereon, the raised flap/transponder area divided by the top flap line which top flap line divides the raised flap transponder area into two portions which are adhesively held together when the top flap line is folded and the adhesive on the bottom of the flap bottom side holds the two portions together forming a flap with a ridge which extends away from the target surface and holds the transponder away from the target surface when the label is mounted thereon.

12. The label according to claim 11, wherein the fold lines include a weakened area selected from the group consisting of perforations, scoring and cuts.

13. The web according to claim 7, wherein the adhesively attachable areas have attachable area face sides configured to face away from the target surface after the label is attached thereto and attachable area bottom sides opposite the attachable area face sides, and the raised flap/transponder area has a flap face side and a flap area bottom side, the attachable areas bottom sides having adhesive thereon to effect attachment to the target surface, the flap bottom side having adhesive thereon, the raised flap/transponder area divided by the top flap line which top flap line divides the flap transponder area into two portions which are adhesively held together when the top flap line is folded and the adhesive on the bottom of the flap bottom side holds the two portions together forming a flap with a ridge which extends away from the target surface and holds the transponder away from the target surface when the label is mounted thereon.

14. The web according to claim 13 wherein the fold lines include a weakened area selected from the group consisting of perforations, scoring and cuts.

15. A target surface in combination with a label, the combination comprising:
a label; and
a target surface, the label comprising two adhesively attached areas attached to the target surface and a raised non-adherent flap/transponder area which is not adhesively attached to the target surface, the raised non-adherent flap/transponder area including a transponder, the adhesively attached areas defined from the raised non-adherent flap/transponder area by two attachable area fold lines with the raised non-adherent flap/transponder area between the two attachable area fold lines, the raised non-adherent flap/transponder area having a top flap line which is at a top of the raised non-adherent flap/transponder area which is raised above and away from the target surface after the adhesively attachable areas are attached to the target surface, the attached area fold lines and the top flap line when folded effect holding the raised non-adherent flap/transponder area away from the target surface and to distance the transponder from the target surface after the adhesively attachable area is attached to the target surface to provide enhanced radio frequency wireless communication functionality as compared to a label which does not distance the transponder from the target surface.

16. The target surface in combination with a label according to claim 15 wherein the fold lines include a weakened area selected from the group consisting of perforations, scoring and cuts.

17. The web according to claim 14, wherein the flap/transponder area is separable along the weakened area from the adhesively attachable areas when the adhesively attachable areas are attached to the target surface.

18. The label according to claim 12, wherein the flap/transponder area is separable along the weakened area from the adhesively attachable areas when the adhesively attachable areas are attached to the target surface.

19. The target surface in combination with a label according to claim 16, wherein the flap/transponder area is separable along the weakened area from the adhesively attachable areas when the adhesively attachable areas are attached to the target surface.

20. A web comprising a backing web and labels, the labels comprising two adhesively attachable areas for adhesive attachment to a target surface and a non-adherent flap/transponder area, the non-adherent flap/transponder area including a transponder, the adhesively attachable areas defined from the non-adherent flap/transponder area by two attachable area fold lines with the non-adherent flap/transponder area between the two attachable area fold lines, the non-adherent flap/transponder area having a top flap line which is to be at a top of the non-adherent flap/transponder area which is raised above and away from the target surface when folded after the adhesively attachable areas are attached to the target surface, the attachable area fold lines and the top flap line when folded effect holding the non-adherent flap/transponder area and transponder away from the target surface after the adhesively attachable areas are attached to the target surface to provide a label which effects wireless enhanced communication by virtue of the transponder being distanced from the target surface, wherein the adhesively attachable areas have attachable area face sides which face away from the target surface after the label is attached thereto, and attachable area bottom sides opposite the attachable area face sides, and the raised flap/transponder area has a flap face side and a flap area bottom side, the attachable areas bottom sides having adhesive thereon to effect attachment to the target surface, the adhesive covered with release paper which upon removal permits attachment to the label to the target surface.

21. A label which is adhesively attachable to a target surface, the label comprising two adhesively attachable areas and a non-adherent flap/transponder area, the non-adherent flap/transponder area including a transponder, the adhesively attachable areas defined from the non-adherent flap/transponder area by two attachable area fold lines with the non-adherent flap/transponder area between the two attachable area fold lines, flap/transponder area providing a non-adherent raised flap/transponder area with a top flap line which when folded is at a top of the non-adherent raised flap/transponder area and is raised above and away from the target surface after the adhesively attachable areas are attached to the target surface, the attachable areas fold lines and the top flap line when folded effect holding the non-adherent raised flap/transponder area and transponder away from the target surface after the adhesively attachable areas are attached to the target surface to provide a label which effects enhanced wireless communication by virtue of the transponder being distanced from the target surface, wherein the adhesively attachable areas have attachable area face sides which face away from the target surface after the label is attached thereto and attachable area bottom sides opposite the attachable area face sides, and the raised flap/transponder area has a flap face side and a flap area bottom side, the attachable areas bottom sides having adhesive thereon to effect attachment to the target surface, the adhesive covered with release paper which upon removal permits attachment to the label to the target surface.

22. The label according to claim 21, wherein the raised flap/transponder area has a flap face side and a flap area bottom side, the flap bottom side having adhesive thereon, the raised flap/transponder area divided by the top flap line which top flap line divides the raised flap transponder area into two portions which are adhesively held together when the top flap line is folded and the adhesive on the bottom of the flap bottom side holds the two portions together forming a flap with a ridge which extends away from the target surface and holds the transponder away from the target surface when the label is mounted thereon.

* * * * *